Sept. 21, 1926.

L. W. DICKINSON

SIGNAL PORT FOR VEHICLE WINDOWS

Filed May 12, 1924

1,600,698

Inventor
Luther W. Dickinson
By Lancaster and Allwine
Attorneys

Patented Sept. 21, 1926.

1,600,698

UNITED STATES PATENT OFFICE.

LUTHER W. DICKINSON, OF INDIANAPOLIS, INDIANA.

SIGNAL PORT FOR VEHICLE WINDOWS.

Application filed May 12, 1924. Serial No. 712,807.

The present invention relates to motor signal devices, and more particularly to that type which may be installed in the present structure of motor vehicles for permitting free use of the arm for signaling to other motor vehicles when stops or changes in direction of travel are to be made.

An object of this invention is to provide a signal port particularly adapted for use by motor vehicles of the closed body type which will permit the free and uninterrupted extension of the driver's arm through the port hole to signal in any approved manner.

Another object of this invention is to provide a device which may be economically installed in motor vehicles of the closed body type in a position convenient to the driver's seat and which will permit instantaneous signaling by the driver to warn passing, approaching or the like vehicles of the intention of the driver to change the direction of his vehicle.

A further object of this invention is to provide a device which will be in such compact form that upon installation in the pane of a vehicle window it will not interfere with the subsequent movement of the window.

A still further object of this invention is to provide a hinged port closure for mounting in the window pane and to equip the closure with means for holding it in open position when the hand is thrust through the port, and to provide easy operable means for releasing the port closure after the signaling operation is completed and the arm is withdrawn into the vehicle.

The above and various other objects and advantages of this invention will in part be described in and in part be understood from the following detailed description of the present preferred embodiment, the same being illustrated in the accompanying drawings, wherein:—

Figure 1:
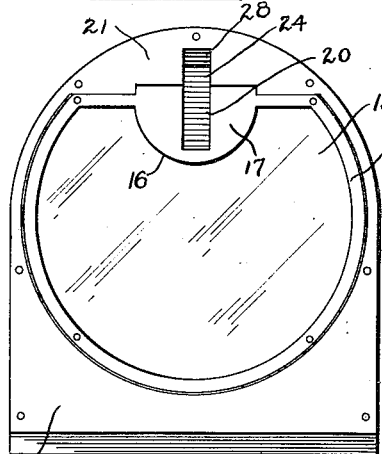
Fig. 1 is an outer side elevation of a signal port and its closure constructed according to the present invention.
Figure 2:
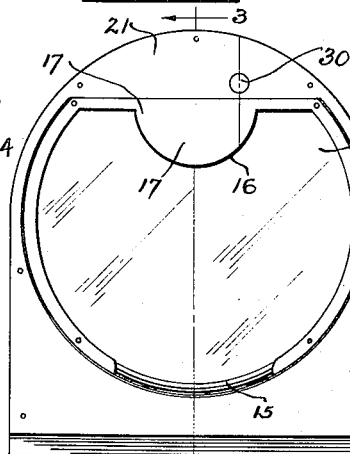
Fig. 2 is an inner side elevation of the same.
Figure 3:
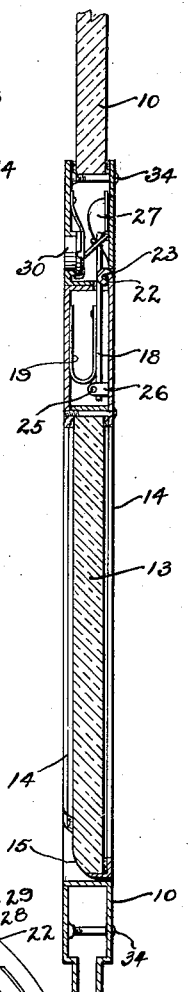
Fig. 3 is a fragmentary enlarged section taken through the device substantially on the line 3—3 of Fig. 2, and showing the adjacent portion of the window pane.
Figure 4:
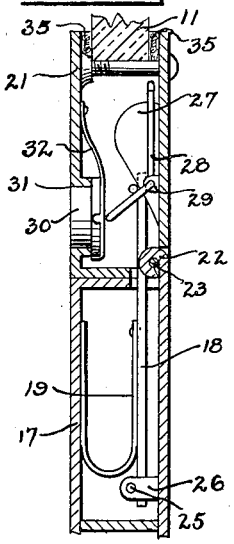
Fig. 4 is a further enlarged vertical fragmentary section of the device in closed position.

Referring to the drawings, and first to Fig. 2, 10 designates a frame of suitable dimensions which is set in an opening or recess formed in a pane of glass 11 which forms a part of one of the windows of a motor vehicle 12. The frame receiving opening of the pane 11 is preferably cut upwardly from the lower edge of the pane and is rounded at its upper end to provide a substantialy semi-circular marginal opening. The configuration of the opening of the pane 11 is resorted to as it facilitates the cutting of the glass and provides for a more stable connection between the pane and the frame.

The lower edge of the frame 10 is reduced to the configuration of the pane so that when the device is installed in a window pane the lower edge will substantially fit into the space formerly occupied by the removed section of the window pane in the bottom of the window frame. A closure 13 of substantially circular shape is fitted in the frame 10 to provide the intermediate portion thereof, and the frame has an opening therethrough of the configuration of the closure 13. The closure 13 is preferably of glass of substantially the same character and thickness as that of the pane 11 and is mounted in a marginal frame 14 which extends across the upper edge of the closure 13 and down the opposite edges thereof. The frame 14 is interrupted at its lower end and inner side to expose the lower edge of the closure 13, and the latter at such exposed lower edge is beveled or rounded off as at 15 to provide a smooth and uninterrupted surface.

In the center of the closure 13 in the upper edge thereof, a small semi-circular section is removed to provide a recess 16 to receive a casing 17 which comprises the upper part of the frame 14, thus providing a housing for the lower end of an anchor rod 18 to which is attached one end of a strap spring 19, the other end of which lies within the casing 17 and bears against the inner wall of the casing and urges the anchor rod 18 outwardly through a slot 20 formed in the outer wall of the casing 17.

The upper end of the anchor rod 18 enters a fixed casing 21 which constitutes a part of the frame 10 and which lies directly above the casing 17. The front wall of the casing 17 is elongated and rolled over to provide a hinge eye 22 which is seated in the outer lower edge of the fixed casing 21 and mounted therein on a pin 23 for hingedly connecting the two casings 17 and 21. When the closure 13 is in the open position the upper end of the rod 18 passes through a slot 24 in the front wall of the upper casing 21 and the slots 20 and 24 form a continuous recess or opening into which the rod 18 may swing when the closure 13 with its frame 14 and casing 17 are swung down into closed position.

The lower end of the rod 18 is anchored to the casing 17 by a pin 25 which engages across the inner side of the casing 17 and is mounted in a pair of lugs 26 which project inwardly from the outer wall of the casing 17. Said upper end of the anchor rod 18 when the door is swung open rides upwardly and over the top of a pair of cams 27 which are attached to the inner surface of the casing 21 at the opposite sides of the slot 24. A release or trip rod 28 whose upper end extends over the cams 27 is hingedly secured to the casing 21 through outstanding lugs 29. The lower end of the trip rod 28 engages a button 30 which is yielding held in an opening 31 in the inner side of the casing 21 by a spring 32. The rod 18 carries, near its upper end and across its inner side, a shoe or crossbar 33, the ends of which project beyond the rod 18 and bear against the surfaces of the cams 27.

The frame 10 is secured to the window pane of the vehicle by a plurality of bolts or screws 34 and packing strips 35 are interspersed between the window pane 11 and the inner edges of the frame 10 to cushion the grip of the latter on the glass. The cams 27 are of peculiar contour in that their upper ends are enlarged and rounded to project inwardly from the front wall of the casing 21 and their upper edges are substantially horizontal to provide a ledge for supporting the shoe 33 and the rod 18 in raised position. The lower portions of the cams 27 are beveled and recede gradually toward said front wall of the casing 21 for guiding the upper end of the rod 18 when the same is drawn down by the closing of the closure 13.

Figure 5:
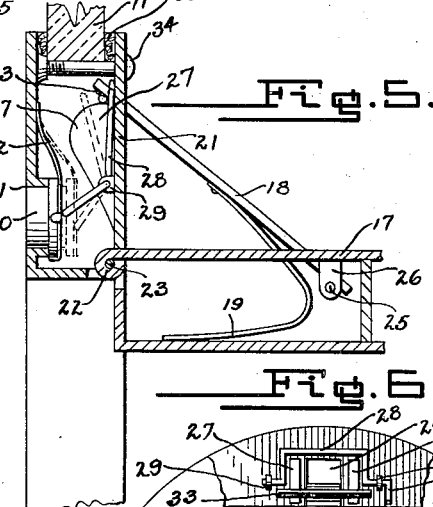
Fig. 5 is a similar view showing the closure in open position.
Figure 6:
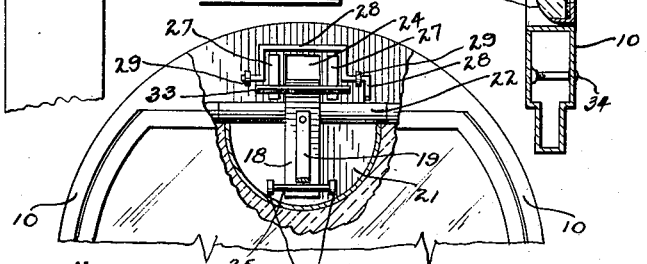
Fig. 6 is a fragmentary inner side elevation of the device, and parts of the same are broken away to show the hinge joint with its locking releasing mechanism.
Figure 7:
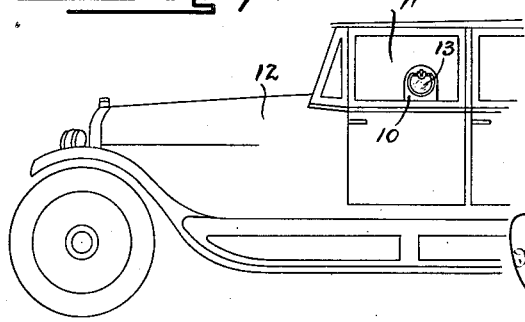
Fig. 7 is a fragmentary side elevation of a conventional type of motor vehicle having the signal port device mounted thereon.

When the device is closed, and the operator wishes to signal with the arm, the hand is projected against the beveled lower end 15 of the closure 13 and the latter is forced outwardly into a substantially horizontal position as shown in Fig. 5. In this position the shoe 33 is raised upon the cams 27 and the flat edge or shoulder of the cams supports the rod 18 and the closure 13 in raised position.

After signalling is done, the operator withdraws his arm through the port opening and depresses the button 30 to swing the trip rod 28 against the shoe 33 and forces the latter inwardly and downwardly over the cams 27, permitting the closure 13 to swing shut.

It is of course understood that various changes and modifications may be made in the size, kind of materials and design of the above specifically described embodiment of the invention without departing from the spirit thereof, such changes and modifications being restricted only by the scope of the following claims:—

1. A signal port comprising a frame adapted for mounting in a window pane of a vehicle, said frame provided with a casing, a closure hinged in the frame, said closure provided with a casing communicating with the casing of said frame, a spring pressed link housed in the said casings of the frame and closure when the closure is in the frame, and adapted to be elevated in the frame when the closure is swung into open position, locking means to hold the closure in open position, and releasing means operable upon the upper end of said link to permit the closure to drop into shut position.

2. A signal port comprising a body frame structure adapted to be mounted in a window pane of a vehicle, a closure frame hingedly mounted on said body frame, a transparent closure in said closure frame, a link loosely mounted at its upper end in said body frame and pivotally and yieldably mounted at its lower end in said closure frame, locking means for holding the closure frame in open position, and releasing means operable upon the upper end of said link to permit the closure frame and closure to drop into shut position.

3. A signal port comprising a body frame adapted to be mounted in a window pane of a vehicle, a transparent closure hinged in the body frame, a spring pressed link pivotally secured at its lower end to said closure and slidably secured at its upper end to said body frame, locking means operable upon the upper end of said link for holding the closure in raised position, and releasing means operable upon said link to permit the closure to drop into shut position.

4. A signal port comprising a frame structure adapted to be mounted in a window pane of a vehicle, a transparent closure hingedly mounted for vertical swinging movement in said frame, a link pivotally secured at its lower end to said closure and loosely mounted at its upper end in said frame, a spring secured at one end to the hinged closure and at the other end yieldably engaging the inner side of the link for urging the same outwardly and upwardly, locking means for holding the closure in open position, and releasing means for releasing the locking means to permit the closure to fall into closed position.

5. In a signaling device, a frame adapted to be mounted in a lateral window pane of a vehicle, a transparent closure hinged in the frame, a spring pressed link housed in the frame and closure and adapted to be elevated in the frame when the closure is swung into open position, means for locking the link from falling when elevated to maintain the closure raised, and releasing means for freeing the upper end of the link to permit the closure to drop into shut position.

6. A signal port comprising a frame adapted to be mounted in a window pane of a vehicle, a closure hingedly mounted in said frame, a link connecting said frame and said closure, a spring mounted in said closure and engaging against said link for assisting in the outward movement of said closure when the closure is opened and for cushioning the downward movement of the closure, locking means for locking the closure in open position, and releasing means for unlocking said locking means to permit the closure to close.

7. A signal port comprising a frame adapted for mounting in a window pane, a closure hingedly mounted in said frame and adapted to be swung upwardly and outwardly, said frame and closure when in closed position substantially falling within the planes of the inner and outer sides of said window pane, a link pivotally mounted at one end in said closure and loosely mounted at the opposite end in said frame and in the upper end thereof, a spring in said closure secured at one side to said closure, the other side of said spring engaging said link and said spring being adapted to assist in the upward and outward movement of said closure, locking means for holding said closure in open position, releasing means for unlocking said locking means to permit the closure to close, said spring being adapted to cushion the closing of the closure.

LUTHER W. DICKINSON.